Dec. 3, 1968  T. H. PEARCE ET AL  3,414,446
METHODS FOR BUILDING PNEUMATIC TIRES
Filed Oct. 22, 1965  3 Sheets-Sheet 3
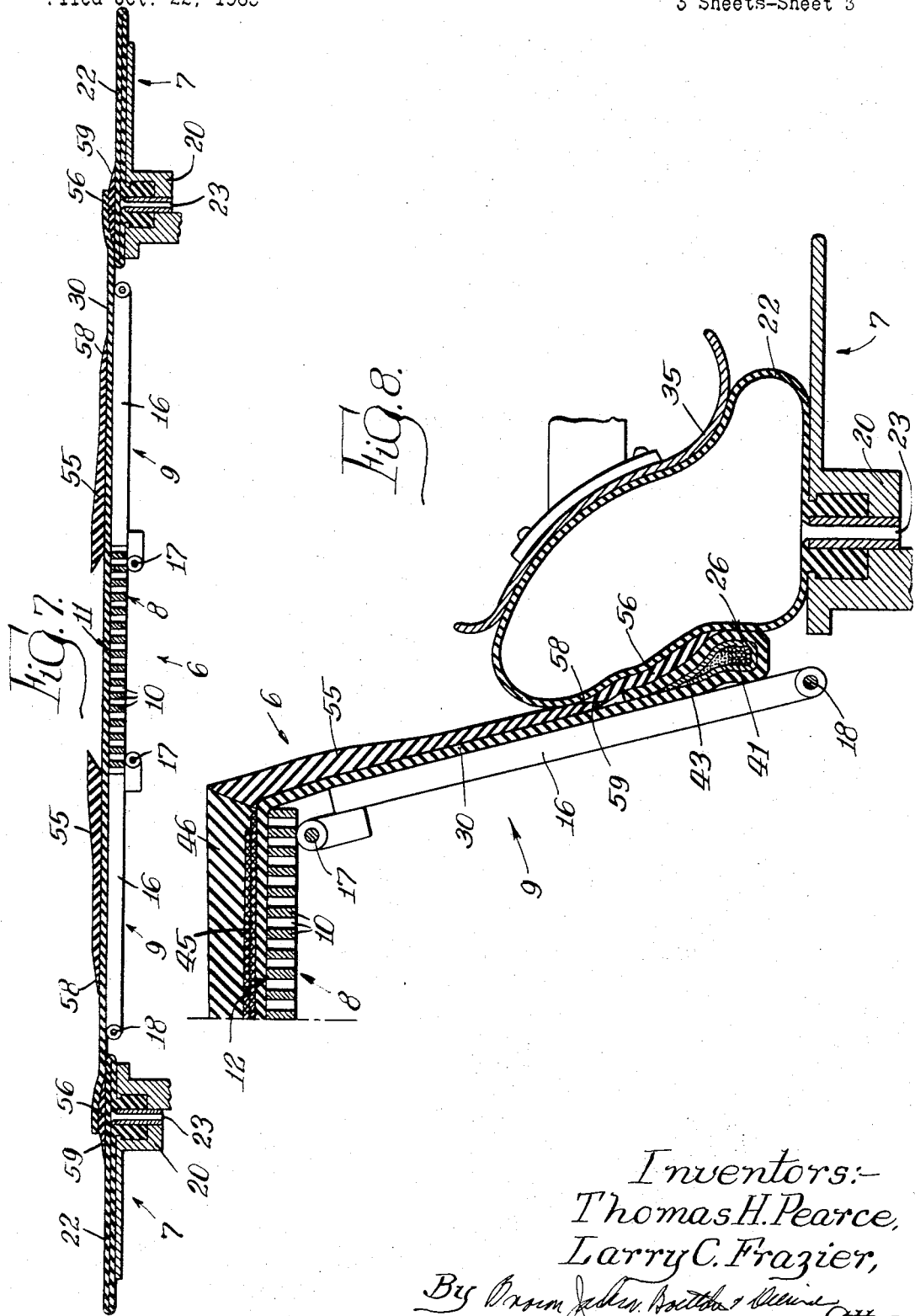
Inventors:-
Thomas H. Pearce,
Larry C. Frazier,
By
Attys.

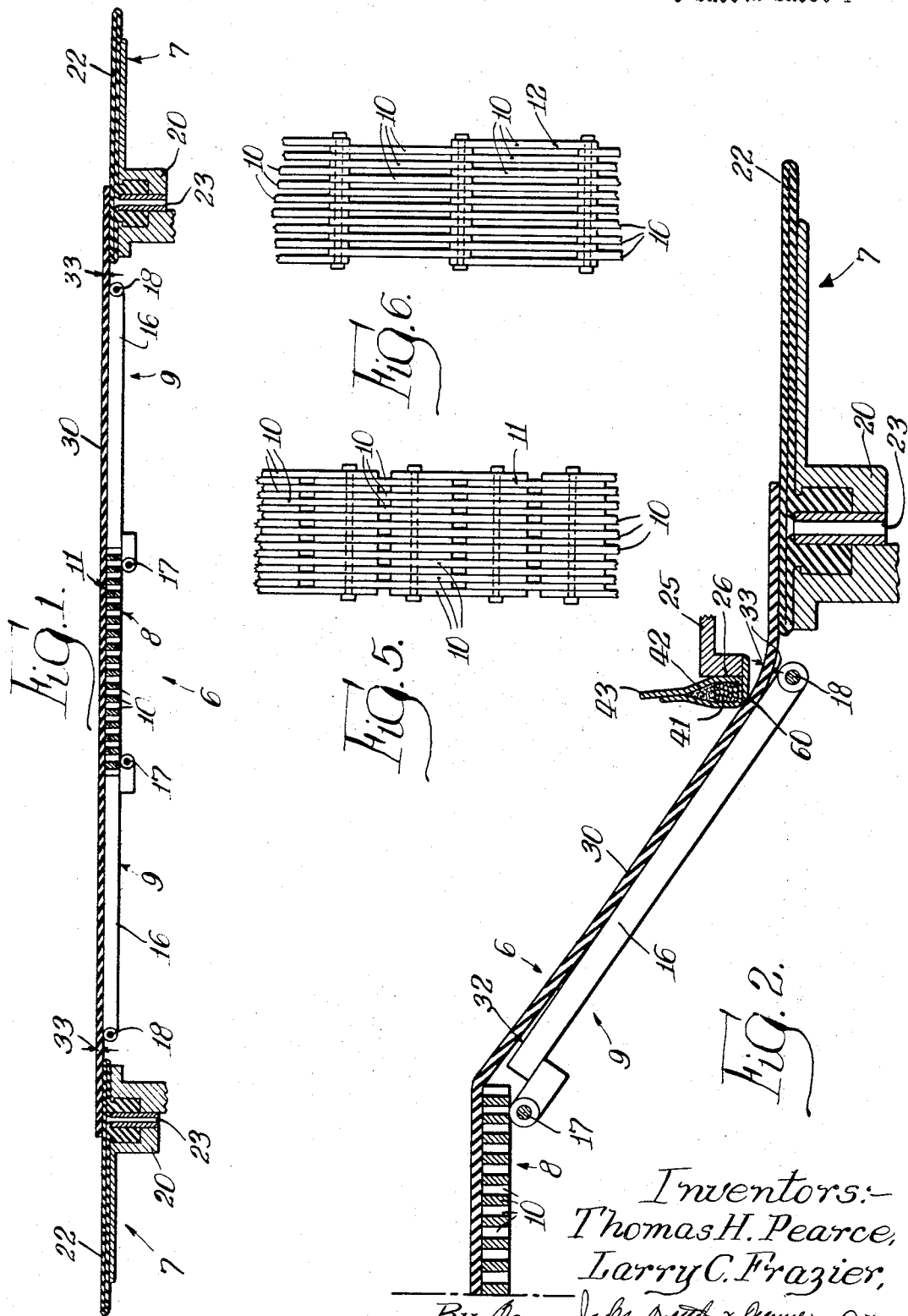

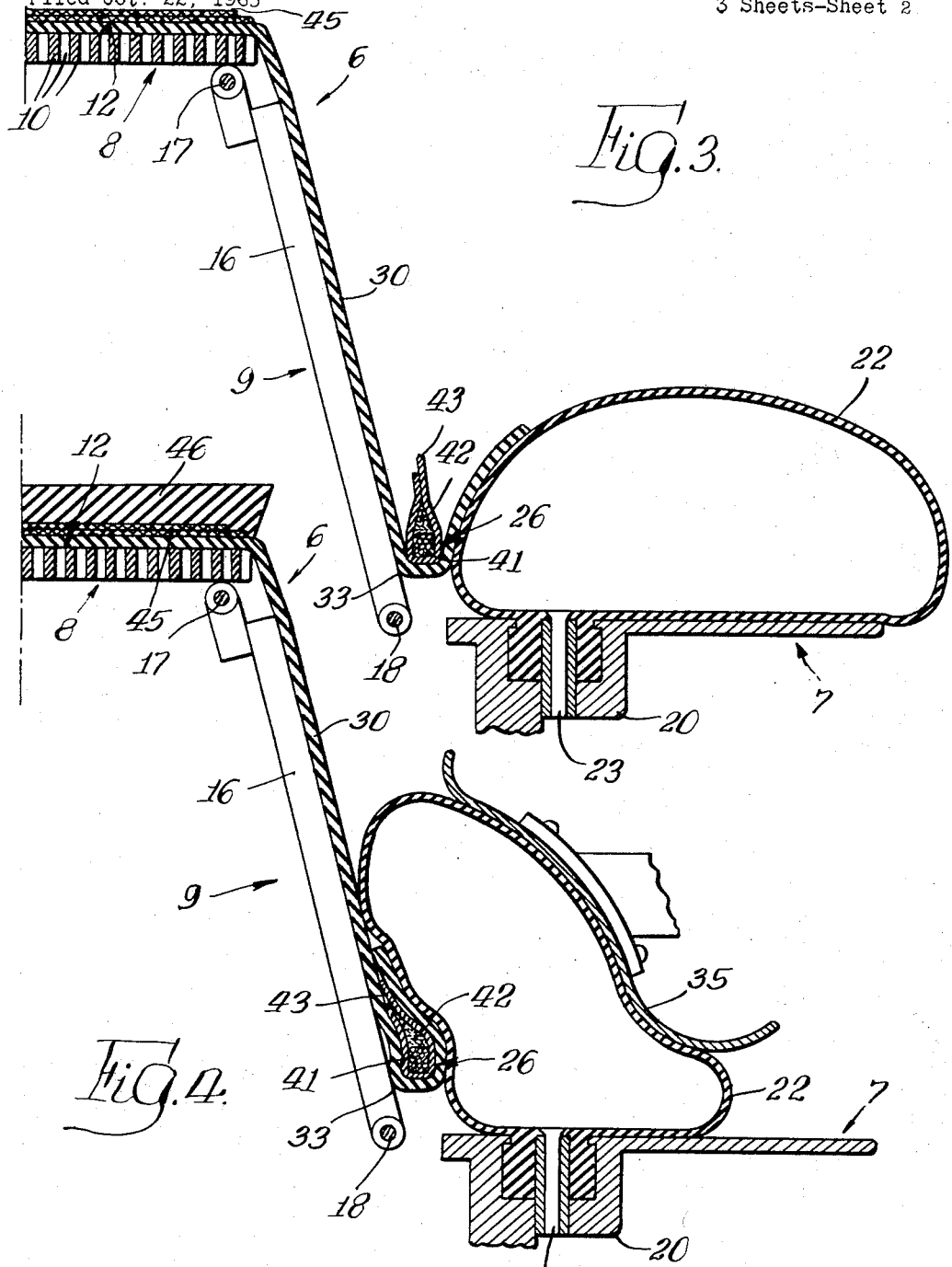

United States Patent Office 3,414,446
Patented Dec. 3, 1968

3,414,446
METHODS FOR BUILDING PNEUMATIC TIRES
Thomas H. Pearce, Niles, Mich., and Larry C. Frazier, Prescott, Ariz., assignors to National-Standard Company, Niles, Mich., a corporation of Delaware
Filed Oct. 22, 1965, Ser. No. 502,064
7 Claims. (Cl. 156—128)

The present invention relates to methods for building pneumatic tires, and more particularly is concerned with methods for building a tire in which there is no substantial relative movement of the tire carcass with respect to the bead rings of the tire causing displacement of the components of the bead rings.

In the known "flat band" tire building methods of the prior art, it is common practice to wrap or otherwise form suitable tire carcass material into a tubular cylindrical configuration around a drum. The drum with the tubular cylinder of tire carcass material disposed thereon is then expanded to provide annular shoulders or ledges at opposite ends thereof serving as seats for bead rings for the tire. After placement of the bead rings the outer end portions of the tubular cylinder are then turned over the bead rings and secured to the carcass. Other elements such as side walls and tread components may be applied to the carcass before or after the tire carcass is removed from the drum, after which the carcass is then expanded to torus configuration and cured to complete the tire. In forming the tire carcass to torus configuration, the material of the carcass at the bead rings revolves or shifts relative to the beads. Such relative movement of the carcass material and bead rings disrupts the desired array of the components of the bead rings so that the latter assume irregular and undesirable positions in the completed tire. The arrangement of bead rings in the tire is critical and in the methods of the prior art unsatisfactory tires frequently result.

In the prior art, drums of varying crown heights have been employed in an attempt to minimize the aforementioned problem. In the so-called "low shoulder" drum in which the drum is expanded only a slight amount sufficient to provide a shoulder against which a bead ring may be seated, the aforementioned problem of relative movement between the carcass material and beads is aggravated. In "high shoulder" drums, the relative movement noted of the carcass material and bead rings is minimized but not to an extent to prevent bead ring distortion, and further in such drums it is difficult to turn the carcass material down over the drum shoulders and to turn the ends of the carcass material over the bead rings.

The purpose of the present invention is to provide methods for building a pneumatic tire in which there is substantially no relative movement between the tire carcass and tire bead rings in the fabrication of the tire causing disruption or distortion of the tire bead rings.

The present invention comprehends as an important object thereof the steps of displacing a cylindrical tubular member of suitable tire carcass material to form an intermediate portion thereof into torus configuration having a central crown portion substantially of the diameter desired in the completed tire and radially extending side wall portions, maintaining the side wall portions under tension, applying bead rings to the side wall portions, and folding or laying the opposite ends of the tubular cylinder over the bead rings to thus provide for incorporation of the bead rings in fixed position and without distorting or disrupting the bead rings.

Other elements such as side walls and tread components may be applied respectively to the side wall portions and crown of the carcass, after which the assembled components may be cured to complete the tire.

The invention comprehends further objects and advantages as will appear from the following detailed description of preferred embodiments of the invention.

Now in order to acquaint those skilled in the art with the manner of practicing the methods of the present invention there shall be described in connection with the accompanying drawings certain preferred embodiments of the invention.

FIGURE 1 is a diagrammatic sectional view of a building drum suitable for use in practicing the methods of the present invention and having a tubular cylinder of tire carcass material mounted thereon;

FIGURE 2 is a view of the right hand components of the drum of FIGURE 1 showing an intermediate position of the parts in displacing the tire carcass material wound on the drum;

FIGURE 3 is a view showing the position of certain of the parts of the drum in fully expanded position and with the tire carcass material formed into torus configuration;

FIGURE 4 is a view showing the manner in which the opposite ends of the tire carcass material are turned or folded over tire bead rings for a tire;

FIGURE 5 is a detail view showing the arrangement of supporting members of the center drum assembly of the drum of FIGURES 1 through 3 in contracted position.

FIGURE 6 is a detail view showing the supporting members of the center drum assembly displaced circumferentially with respect to each other in expanded position.

FIGURE 7 is a view of the drum of FIGURE 1 but showing one manner in which side walls may be applied to the tubular cylinder of tire carcass material; and FIGURE 8 is a view similar to FIGURE 4 and showing the manner in which the side walls of the tire are applied to the tire carcass.

Referring now to the drawings there is shown diagrammatically in FIGURES 1 through 4 an apparatus for practicing the methods of the present invention. The apparatus comprises an intermediate drum assembly, indicated generally at 6, and end drum assemblies 7 disposed at opposite ends of the intermediate drum assembly 6. The intermediate drum assembly 6, in turn, comprises a center drum assembly, indicated at 8, and side drum assemblies indicated at 9. The intermediate drum assembly 8 comprises a plurality of supporting members 10, which as best seen in FIGURES 5 and 6 are movable radially inwardly and outwardly of the axis of the drum and circumferentially relative to each other to provide in the radial inward position thereof, as shown in FIGURES 1 and 5, a first cylindrical and rigid supporting surface 11. The supporting members 10 of the center drum assembly 8 upon radial outward movement also move circumferentially relative to each other progressively from the position shown in FIGURES 1 to 5 to the positions shown in FIGURES 3, 4 and 6 and in the latter position are in their outer radial position so as to define a second cylindrical and rigid supporting surface 12 of greater diameter than but of the same axial extent as the first cylindrical supporting surface 11 The second cylindrical supporting surface 12 as will appear is substantially of a diameter to provide a crown portion for the tire carcass material of substantially the desired diameter for a finished tire.

The side drum assemblies 9 each comprise a plurality of circumferentially arranged drum side lever arms 16 pivoted at their inner ends, as at 17, with respect to a suitable frame for the center drum assembly 8 to provide, upon radial outward movement of the center drum assembly 8 from the inner position shown in FIGURE 1 to the outer position shown in FIGURES 3 and 4, for positioning the drum side lever arms 9 to extend angularly away from the outer edges of the center drum assembly and toward the axis of drum 6 as shown in FIGURES 3 and 4. The outer ends 18 of the drum side lever arms 16 may be guided in suitable manner for axial inward movement toward the center drum assembly 8 upon the radial outward movement of the latter.

The end drum assemblies 7 each comprise annular supporting frames 20 for supporting annular inflatable bags 22. A valve inlet 23 provides for admission of air under pressure into the inflatable bags 22 to provide turn ups of the tire carcass material about the bead rings of a tire as will be presently described.

The apparatus further comprises annular bead placing ring members 25 of internal diameters to move axially over the bags 22 of the end drum assemblies 7 when the inflatable bags are deflated to provide for positioning of bead ring components 26 for a tire carcass to be built upon the drum.

In the apparatus shown upon the radial outward movement of the center drum assembly 8, the end drum assemblies 7 move axially inwardly so as to be maintained in substantially the same relative position with respect to the inner ends 18 of the drum side lever arm 16 of the side drum assemblies 9.

In practicing one method according to the present invention, the several components of the drum assembly are disposed in the positions shown in FIGURE 1, and, in which, position any suitable tire carcass material is layed or disposed around the outer peripheries of the center drum assembly 8, the side drum assemblies 9 and the inner end portions of the peripheries of the end drum assemblies 7. Thus, a tubular cylinder 30 of tire carcass material is disposed about the outer surfaces of the several components making up the drum. With the tubular cylinder of tire carcass material thus disposed on the drum, the center drum assembly 8 is moved radially outwardly, and which, as shown in FIGURE 2, carries the pivoted ends 17 of the drum side lever arms 16 radially outwardly and the ends 18 of the drum side lever arms axially inwardly. In this movement of the center drum assembly and drum side lever arms the tire carcass material 30 is displaced tending to form a gap, as indicated at 32, at each of the side edges of the center drum assembly 8 and the adjacent pivoted ends 17 of the drum side lever arms with such displacement of the material tending to cause the carcass material to move radially outwardly as indicated by the arrows at 33 in FIGURE 2. In order to prevent such displacement of the material, the bead placing rings 25 may be moved axially inwardly with the beads 26 mounted thereon so as to effect a light frictional drag against the tire carcass material causing the tire carcass material to be held taut or in tension from the shoulders or outer edges of the carcass material on the center drum assembly 8 to adjacent outer end portions of the drum side lever arms 16 as indicated at point 33. This loading or application of frictional drag to the portion of the tire carcass material supported on the drum side lever arms 16 continues until the center drum assembly is disposed to its maximum outward radial position, and, in which, the tire carcass material is disposed to substantially torus configuration substantially approximating the cross-sectional configuration of a completed tire. Upon displacement of the tire carcass material to the position shown in FIGURE 3, the bead placing rings 25 are biased axially inwardly to stitch or adhere the bead components 26 to the tire carcass material at portion 33. Thereafter, the bead placing rings 25 are moved axially outwardly. Then, as shown in FIGURE 4, air under pressure is admitted through the ported openings 23 and the inflatable bags 22 biased axially inward by bag pushers 35 to effect folding or turning over the opposite end portions of the tubular cylinder tire carcass material to encase the bead rings 26. The bead rings 26 may be of any conventional or desired construction and may, for example, comprise bead wire 41 wound to form an annular ring together with a gum neck 42 and bead flip 43.

After the outer ends of the tubular cylinder of tire carcass material have been turned over the bead rings 26 the bags 22 are deflated and bag pushers 35 retracted and the remainder of components of the drum returned to the positions shown in FIGURE 1. In thus constructing a tire carcass and assembling the bead rings therewith, it will be observed that upon subsequent curing of the carcass thus formed into a tire that there will be no substantial relative movement between the material of the tire carcass and the bead rings so that the bead rings are embedded in the completed tire without distorting or displacing them relative to the tire carcass.

The foregoing method embodies the fundamental steps of the method of the present invention. It will be understood, however, that side wall components and other elements of a tire, such as an annular breaker strip 45 and tread component 46 may be applied to the tire carcass in the fully radially displaced position of the center drum assembly 8 as shown in FIGURE 3.

In a modified method of the present invention, as seen in FIGURES 7 and 8, upper side wall portions 55 may be applied around the periphery of the tubular cylinder of tire carcass material 30 at the drum side lever arm members 16, and lower side wall portions 56 may be disposed between the inflatable bags 22 and the outer ends of the tubular cylinder of tire carcass material 30. The lower edges of the upper side wall portions 55 may be beveled as at 58 to conform to the bevel 59 of the lower side wall portions 56 so that upon turning up of the outer ends of the tubular cylinder of tire carcass material these bevel edges are joined or butted as seen in FIGURE 8. Similarly the upper edges of the upper side wall portions 55 may be beveled to lie at the side edges of the expanded center drum assembly with the bevel of the upper side walls conforming with the bevel edges of the tread component 60 to secure the tread component and upper side wall peripherally around the tire at the shoulders or edges of the center drum assembly.

It will be observed that in the drum assembly aforedescribed that the center drum assembly 8 provides a rigid cylindrical surface in its contracted and expanded positions, and that the drum side lever arms 16 form solid or rigid support for the side wall portions of the tire carcass. Thus, the center drum assembly provides a firm rigid surface for application of the breaker and tread to the displaced tubular cylinder tire carcass material 30, and the rigid drum side lever arms provide rigid support of the side wall material of the tire carcass to enable placing of the beads against the side wall portions by the bead placing ring 25.

It will be understood that in practicing the present invention that the bead ring components 26 may be supported in any suitable manner to provide the aforementioned frictional drag on the side wall portions of the tubular carcass material in displacement from the cylindrical shape to the torus configuration. If desired, and as shown in the drawings, the bead placing ring 25 may be provided with a bead toe 60 for engaging the tire carcass material so as to avoid any possible twisting or turning of the bead rings. Further, in this regard the known annular rotatable beads may be utilized in lieu of the bead placing ring and bead as described in connection with FIGURES 1 through 3 for holding or tensioning the side wall portions in displacement of the cylinder of tire carcass material from cylindrical shape to the torus configuration. In the latter case after the material has been formed into torus configuration the rotatable beads may be removed and bead placing rings, such as shown at 25, may be moved axially inwardly to apply bead rings carried thereby to the side wall portions of the torus configuration of the tire carcass material.

In the foregoing methods upon radial outward movement of the center drum assembly 8 the end drum assemblies 7 may be retarded in their axial inward movement to tension the tire carcass material under and extending axially outwardly of the bead rings 26 to provide for snugly encasing the bead rings in turning or laying over of the opposite outer ends of the tubular cylinder of tire carcass material.

While there have been shown and described certain preferred embodiments of the invention, it will be understood that various modifications and rearrangements may be made therein without departing from the spirit and scope of the invention.

The invention claimed is:

1. In a method of forming a tire from a tubular cylinder of tire carcass material, the steps comprising displacing an intermediate portion of the tubular cylinder into substantially torus configuration to provide a crown portion substantially of the diameter of the tire and with annular side wall portions extending inwardly from the periphery of the opposite edges of said crown portion to end portions of said tubular cylinder, maintaining said side wall portions under tension while displacing said intermediate portion of said tubular cylinder into said torus configuration, applying bead rings to said side wall portions radially outwardly of the end portions of said tubular cylinder, and then turning said end portions of said tubular cylinder over said bead rings and into engagement with said side wall portions radially outwardly of said bead rings.

2. In a method of forming a tire from a tubular cylinder of tire carcass material, the steps comprising displacing an intermediate portion of the tubular cylinder into substantially torus configuration to provide a crown portion substantially of the diameter of the tire and with annular side wall portions extending inwardly from the periphery of the opposite edges of said crown portion to end portions of said tubular cylinder, engaging said side wall portions while displacing said intermediate portion of said tubular cylinder into said torus configuration to maintain said side wall portions under tension, applying bead rings to said side wall portions radially outwardly of the end portions of said tubular cylinder, and then turning said end portions of said tubular cylinder over said bead rings and into engagement with said side wall portions radially outwardly of said bead rings.

3. In a method of forming a tire from a tubular cylinder of tire carcass material, the steps comprising displacing an intermediate portion of the tubular cylinder into substantially torus configuration to provide a crown portion substantially of the diameter of the tire and with annular side wall portions extending inwardly from the periphery of the opposite edges of said crown portion to end portions of said tubular cylinder, supporting bead rings in engagement with said side wall portions while displacing said intermediate portion of said tubular cylinder into said torus configuration to maintain said side wall portions under tension, fixing said bead rings to said side wall portions and then turning said end portions of said tubular cylinder over said bead rings and into engagement with said side wall portions radially outwardly of said bead rings.

4. In a method of forming a tire from a tubular cylinder of tire carcass material, the steps comprising displacing an intermediate portion of the tubular cylinder into substantially torus configuration to provide a crown portion substantially of the diameter of the tire and with annular side wall portions extending inwardly from the periphery of the opposite edges of said crown portion to end portions of said tubular cylinder, maintaining said side wall portions under tension while displacing said intermediate portion of said tubular cylinder into said torus configuration, applying bead rings to said side wall portions radially outwardly of the end portions of said tubular cylinder, turning said end portions of said tubular cylinder over said bead rings and into engagement with said side wall portions radially outwardly of said bead rings, and then applying a tread component to said crown portion.

5. A method of forming a tire from a tubular cylinder of tire carcass material having an intermediate and opposite outer end portions, the steps comprising displacing said intermediate portion of the tubular cylinder into substantially torus configuration to provide and rigidly support a crown portion substantially of the diameter of the tire and with annular side wall portions extending inwardly from the periphery of the opposite edges of said crown portion to said outer end portions of said tubular cylinder, maintaining said side wall portions under tension with said crown portion rigidly supported while displacing said intermediate portion of said tubular cylinder into said torus configuration, applying bead rings to said side wall portions radially outwardly of said outer end portions of said tubular cylinder, turning said end portions of said tubular cylinder over said bead rings, and then applying a tread component around said crown portion while the latter is rigidly supported.

6. A method of forming a tire from a tubular cylinder of tire carcass material having an intermediate and opposite outer end portions in which upper side wall components are disposed on the outer surface of said intermediate portion with the inner edges of said upper side wall components spaced apart at the central portion of said intermediate portion, and in which lower side wall components are disposed at the inner surfaces of the outer end portions of said tubular cylinder, the steps comprising displacing said intermediate portion of the tubular cylinder into substantially torus configuration to provide a crown portion at said central portion substantially of the diameter of the tire and with annular side wall portions bearing said upper side wall components extending inwardly from the periphery of the opposite edges of said crown portion to said outer end portions of said tubular cylinder, maintaining said side wall portions under tension while displacing said intermediate portion of said tubular cylinder into said torus configuration, applying bead rings to said side wall portions radially outwardly of said outer end portions of said tubular cylinder, and then turning said end portions of said tubular cylinder over said bead rings to dispose said lower side wall components adjacent said upper side wall components.

7. In a method of forming a tire from a tubular cylinder of tire carcass material, the steps comprising displacing an intermediate portion of the tubular cylinder into substantially torus configuration to provide a crown portion substantially of the diameter of the tire and with annular side wall portions extending inwardly from the periphery of the opposite edges of said crown portion to end portions of said tubular cylinder, engaging said side wall portions while displacing said intermediate portion of said tubular cylinder into said torus configuration to maintain said side wall portions under tension, applying bead rings to said side wall portions radially outwardly of the end portions of said tubular cylinder, tensioning the portions of said tubular cylinder under and extending axially outwardly of said bead rings, and then turning said end portions of said tubular cylinder over said bead rings and into engagement with said side wall portions radially outwardly of said bead rings.

References Cited

UNITED STATES PATENTS

| 2,567,064 | 9/1951 | Frazier | 156—132 |
| 2,715,931 | 8/1955 | Frazier | 156—132 |
| 2,715,932 | 8/1955 | Frazier | 156—401 X |
| 3,078,204 | 2/1963 | Appleby | 156—132 |
| 3,171,769 | 3/1965 | Henley et al. | 156—132 |

HAROLD ANSHER, *Primary Examiner.*